United States Patent [19]

Dost et al.

[11] Patent Number: 4,490,756
[45] Date of Patent: Dec. 25, 1984

[54] SERVO ENCODEMENT AND DETECTION SYSTEM USING TETRA-ORTHOGONAL SERVO PATTERN

[75] Inventors: Martin H. Dost, Los Gatos; Chung C. Liu; Francis E. Mueller, both of San Jose, all of Calif.

[73] Assignee: International Business Machines Corporation, Armonk, N.Y.

[21] Appl. No.: 438,219

[22] Filed: Nov. 1, 1982

[51] Int. Cl.³ .............................. G11B 5/58
[52] U.S. Cl. ......................... 360/77; 360/78
[58] Field of Search .............. 360/77, 78, 131, 135; 369/43, 44

[56] References Cited

U.S. PATENT DOCUMENTS

| | | | |
|---|---|---|---|
| 3,404,392 | 10/1968 | Sordello | 340/174.1 |
| 3,765,005 | 10/1973 | Cannon | 340/174.1 G |
| 3,821,798 | 6/1974 | Cannon | 360/51 |
| 3,956,769 | 5/1976 | Beecroft et al. | 360/77 |
| 4,213,148 | 7/1980 | Clemens | 358/128.6 |
| 4,286,296 | 8/1981 | Cunningham | 360/77 |
| 4,318,141 | 3/1982 | Haynes | 360/77 |
| 4,432,026 | 2/1984 | Coleman, Jr. | 360/77 |

OTHER PUBLICATIONS

"Recording Servo Information Below a Data Surface in a Homogeneous Medium", T. A. Schwarz; TMB Technical Disclosure Bulletin, vol. 17, No. 2, Jul. 1974; pp. 536–539.

Primary Examiner—George G. Stellar
Attorney, Agent, or Firm—Walter J. Madden, Jr.

[57] ABSTRACT

A track-seeking and track-following servo encodement and detection system employs a servo pattern using a reference signal and control signals, the control signals having an orthogonal phase relationship to each other by cyclically revolving in phase by 90°, 180°, 270°, and repeating this pattern every four tracks.

7 Claims, 6 Drawing Figures

TWO FREQUENCY $a = A(x) \sin 2\pi f_0 t$
$b = B(x) \sin 2\pi f_1 t$

SINGLE FREQUENCY DUAL PHASE $a = A(x) \sin 2\pi f t \qquad\quad + \sin 2\pi f_r t$
$b = B(x) \sin(2\pi f t + 180°) + \sin 2\pi f_r t$

ORTHOGONAL $a = A(x) \sin 2\pi f t \qquad\quad + \sin 2\pi f_r t$
$b = B(x) \sin(2\pi f t + 90°) + \sin 2\pi f_r t$ $x$ = HEAD DISPLACEMENT $f = 2f_r$

HEAD POSITION ERROR SIGNALS FOR TRACK CROSSING MOTION $$a = A(x) \sin(2\pi ft) + \sin 2\pi f_r t$$
$$b = B(x) \sin(2\pi ft + 90°) + \sin 2\pi f_r t$$
$$c = C(x) \sin(2\pi ft + 180°) + \sin 2\pi f_r t$$
$$d = D(x) \sin(2\pi ft + 270°) + \sin 2\pi f_r t$$

$x$ = HEAD DISPLACEMENT

FUNCTIONAL BLOCK DIAGRAM OF TETRA-ORTHOGONAL SYSTEM

DECODE LOGIC TABLE:

IF PES A ≥ PES B, P = 1, OTHERWISE P = 0
IF PES A ≥ PES-B, Q = 1, OTHERWISE Q = 0

| P | Q | FINIAL PES |
|---|---|---|
| 0 | 1 | PES A |
| 0 | 0 | PES B |
| 1 | 0 | -PES A |
| 1 | 1 | -PES B |

COMPUTER SIMULATION OF 20-TRACK HEAD MOVE (SINGLE DENSITY)

SERVO ENCODEMENT AND DETECTION SYSTEM USING TETRA-ORTHOGONAL SERVO PATTERN

CROSS-REFERENCE TO RELATED APPLICATION

Copending application Ser. No. 438,218, filed Nov. 1, 1982, entitled "Buried Servo Recording System Using Phase Encoded Servo Pattern", discloses a servo pattern using a reference signal and control signals, adjacent ones of the latter being 180° out of phase with each other.

FIELD OF THE INVENTION

This invention relates to magnetic disk files employing track seeking and track following servo systems.

BACKGROUND OF THE INVENTION

The present invention relates to position encodement and detection for servo systems used in disk files employing continuous servo information for track-seeking and track-following operations to enable high track densities. The invention is described herein in connection with a magnetic disk file, but it is usable in other environments as well. Early magnetic recording disk files employed open loop positioning systems for controlling the movement of one or more magnetic heads to different concentric recording tracks on a magnetic disk or disks. With the demand for increased track density, closed loop servo systems were employed utilizing a separate disk surface dedicated to track position information, as first commercially exemplified by the IBM 3330 disk file.

In some disk files, particularly in lower cost files, sector servo systems have been utilized, in which sectors of track position information are interspersed around the disk surface between adjacent data areas. While such sector servo systems have the advantage that the servo information resides on the same disk surface as the data tracks on which track-following is to take place, they have the disadvantage that they inherently reduce the area available for recording data.

It has long been recognized that a servo system in which the servo information and data coexist in a disk would be desirable. Even though such techniques have been known to be desirable, they have never been exploited, apparently because of the mutual interference between signals from the so-called buried servo and signals from data tracks, or the expense of providing a multiple layer magnetic coating, one for the position-indicating servo signals and another for the data signals.

An early teaching of superposed data and servo signals is found in U.S. Pat. No. 3,404,392. This patent teaches using a dual layer magnetic coating on a disk substrate, a lower layer having a higher retentivity and coercivity than the upper layer. A servo signal is first recorded in the lower layer for indicating track positions, and following such recording, data signals are recorded. During the operation, both servo and data signals are sensed.

A later development is shown in the IBM Technical Disclosure Bulletin, Vol. 17, No. 2, July 1974, beginning at page 536. This shows a single magnetic coating on a substrate, and teaches that the ratio of the frequency of the data signals to the servo signal should be 10:1, and that the servo signal can be successfully recorded with a head having sufficient ampere-turns capability.

U.S. Pat. No. 3,765,005 teaches using a clock-bias signal at the upper end of a data signal frequency spectrum. Also, U.S. Pat. No. 3,821,798 shows a low frequency control signal recorded at a lower end portion of the data signal pass band.

A later reference showing buried servo is U.S. Pat. No. 3,956,769, which teaches the use of two separate gaps in a transducer; one for servo signals and one for data signals.

SUMMARY OF THE INVENTION

The present invention relates to a new pattern which may be used for buried or dedicated servo information to produce increased accuracy in both track-seeking and track-following operations.

BRIEF DESCRIPTION OF THE DRAWINGS

FIG. 2b shows waveforms generated by the circuitry of FIG. 2a;

DESCRIPTION OF THE PREFERRED EMBODIMENT

One of the servo patterns used in early buried servo work consisted of sinusoids of two different frequencies, $f_0$ and $f_1$, alternating from track to track. This approach suffered from offset problems due to differences in gain from the $f_0$ and $f_1$ detection channels.

Figure 1:
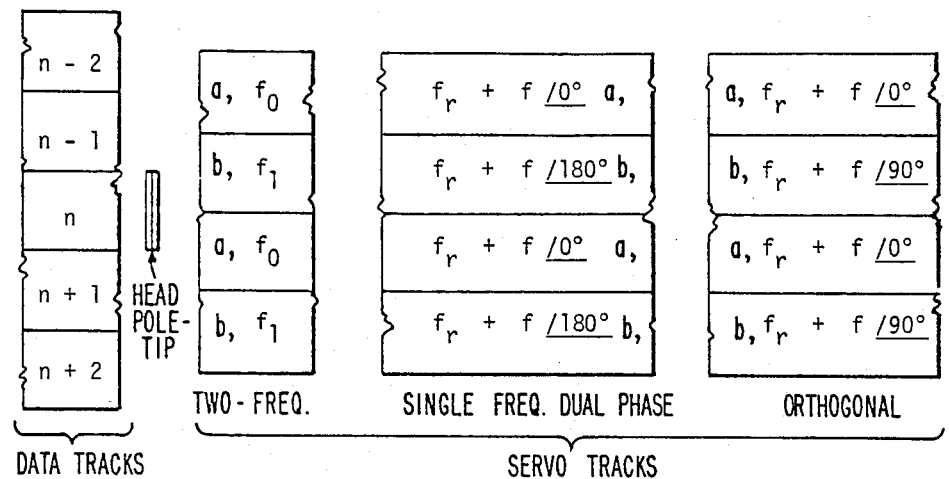
FIG. 1 shows some of the above-discussed prior art buried servo patterns.

To overcome the offset problem, two new servo patterns were suggested. They used sinusoidal signals of a single frequency f, but different phases for servo information. In the technique used in the above-identified related application, the pattern used 0° and 180° phase angles alternately on adjacent servo tracks, while the other used 0° and 90° phase angles, or an "orthogonal" pattern. Both schemes required an additional signal, called a reference signal, to be superimposed on all tracks. This reference signal also served as a clock and was used for detection purposes. The frequency of the reference signal was different from that of the servo frequency and a ratio of a servo frequency twice that of the reference frequency has been demonstrated. FIG. 1 shows the three different prior art servo patterns described above for comparison purposes. The magnetic head pole tip is shown in on-track position.

Figure 2A:
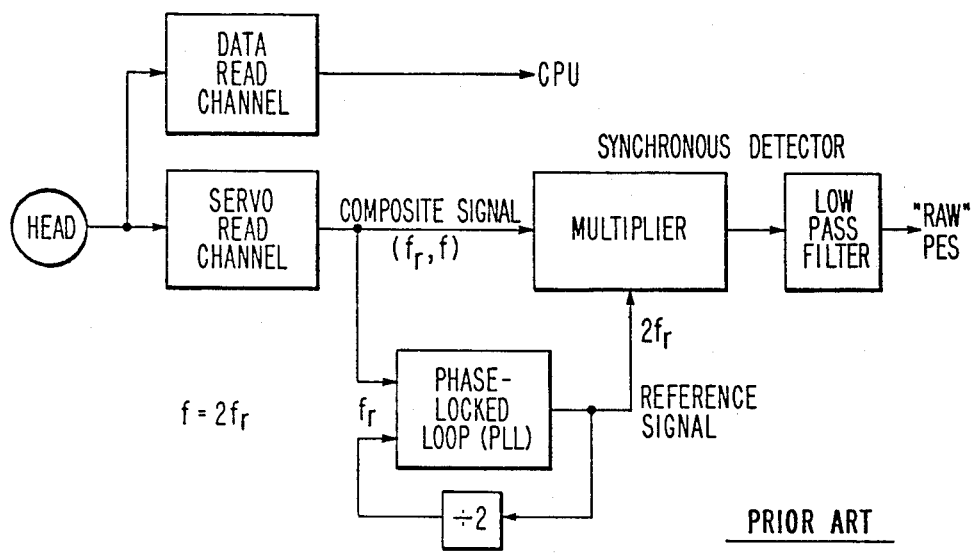
FIG. 2a shows circuitry for implementing the servo system represented by the single frequency dual phase pattern in FIG. 1.
Figure 2B:
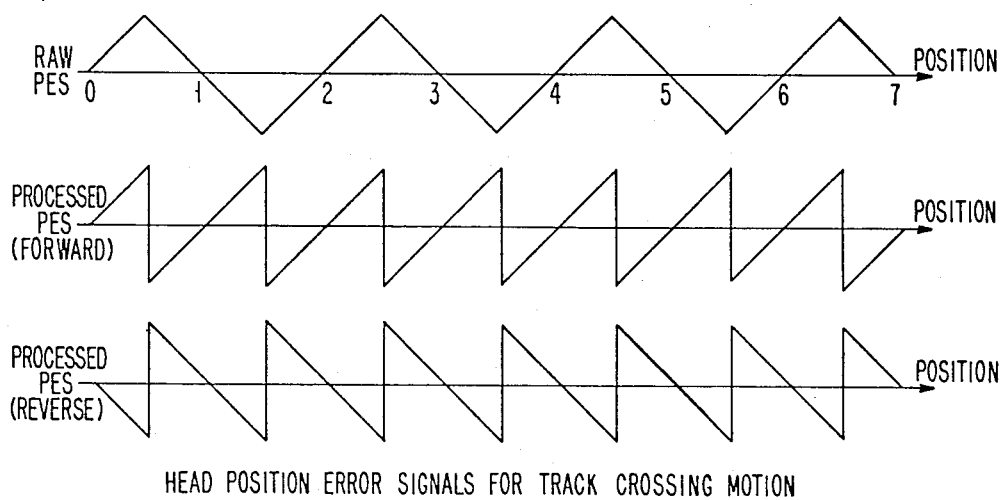

In these prior art systems, by operating on the composite head signal and by synchronous detection, a "raw" position error signal (PES) is obtained, as shown in FIG. 2b using the circuitry shown in FIG. 2a. The synchronous detection process is described as follows: the incoming composite head signal is first multiplied a reference signal generated by a phase locked loop and then low pass filtered, the filter bandwidth being chosen to match the servo performance requirements. The frequency of the phase locked loop (PLL) generated reference signal is $2f_r$, because of a "divided-by-two" counter in the feedback loop. The PLL is exactly synchronized with the reference component of the composite head signal, in both phase and frequency. The desired raw PES is fully detected at the output of the lowpass filter.

In the prior art systems described above, slope reversal of the PES occurs for every other track, i.e., all odd numbered tracks have a different polarity from even numbered tracks, requiring frequent sign changing and appropriate detection switching circuitry for that purpose. Since this processed PES serves as a fine position indicator, in addition to a coarse staircase-like position error signal, obtained by counting track crossings and digital-to-analog (D/A) conversion, its polarity determines the direction of motion of the head controlled by the servo mechanism. Depending on the desired direction of motion (forward or reverse), different polarity rules have been implemented.

Figure 3:
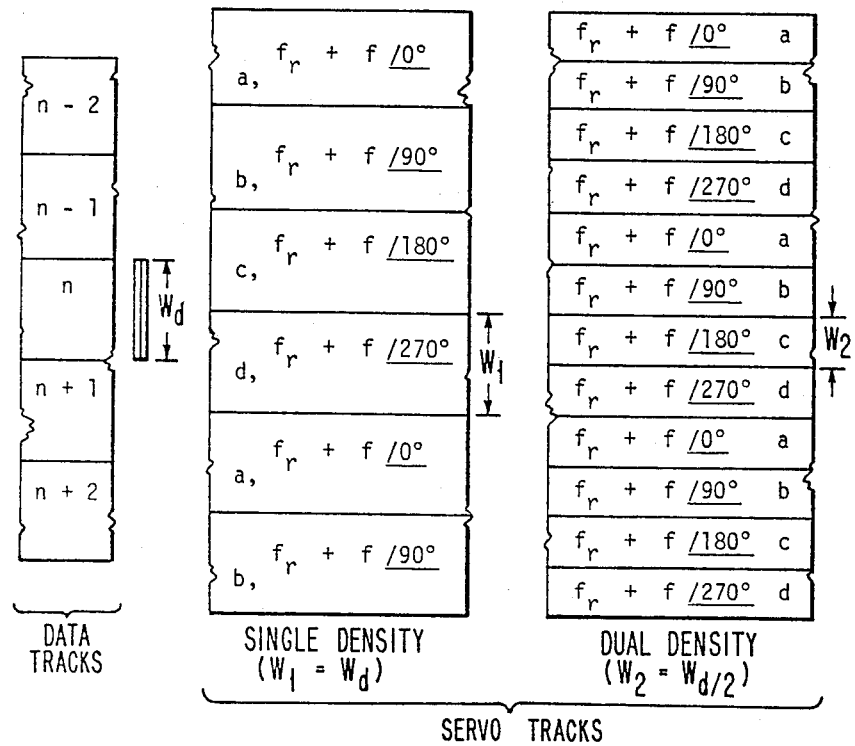
FIG. 3 illustrates two embodiments of the tetra-orthogonal servo pattern of the present invention.

The present encodement scheme accomplishes all of these requirements in a straightforward way. Basic to the system is the servo pattern shown in FIG. 3. In the present servo encodement technique, a reference signal, $f_r$, is recorded in each track with the same phase relationship. The head reads the same signal with respect to the reference signal regardless of its track position. In addition, a second signal whose frequency is a multiple of the reference signal is added to the reference signal. In the preferred embodiment, the second or control signal will have a frequency twice the reference signal. This pattern is called "Tetra-Orthogonal", due to the fact that the phases of adjacent track signals are orthogonal to each other; however, not alternating between 0° and 90°, but cyclically revolving (0°, 90°, 180°, 270°) and repeating themselves every 4 tracks, as indicated in FIG. 3. The edges of adjacent servo tracks define the centerline of a data track. The equations for the signals in the different servo tracks are given in FIG. 3.

As shown in FIG. 3, the servo tracks may be recorded with the same density as the data track density (servo track width $W_1$ and data track width $W_d$ are equal), or with dual density (servo track width $W_2$ is one-half of the data track width $W_d$), in which case it will result in interpolation for half-track centers and with an extended linear range.

There are two distinct PES output signals detected from this invention as compared to only one PES signal from prior art systems. These two PES outputs are said to be quadrature with respect to each other. One output is defined as primary PES and the other quadrature PES. Quadrature form may be defined as two signals related to each other as sine and cosine functions. This means that the zero crossings and the polarities should be the same as if the primary PES is a sine, and the quadrature PES is a cosine, with displacement position relating to angle. The system with quadrature PES output has the advantage of twice as large a PES linear range as the single PES system. This property is well known to those skilled in the art.

Figure 4:
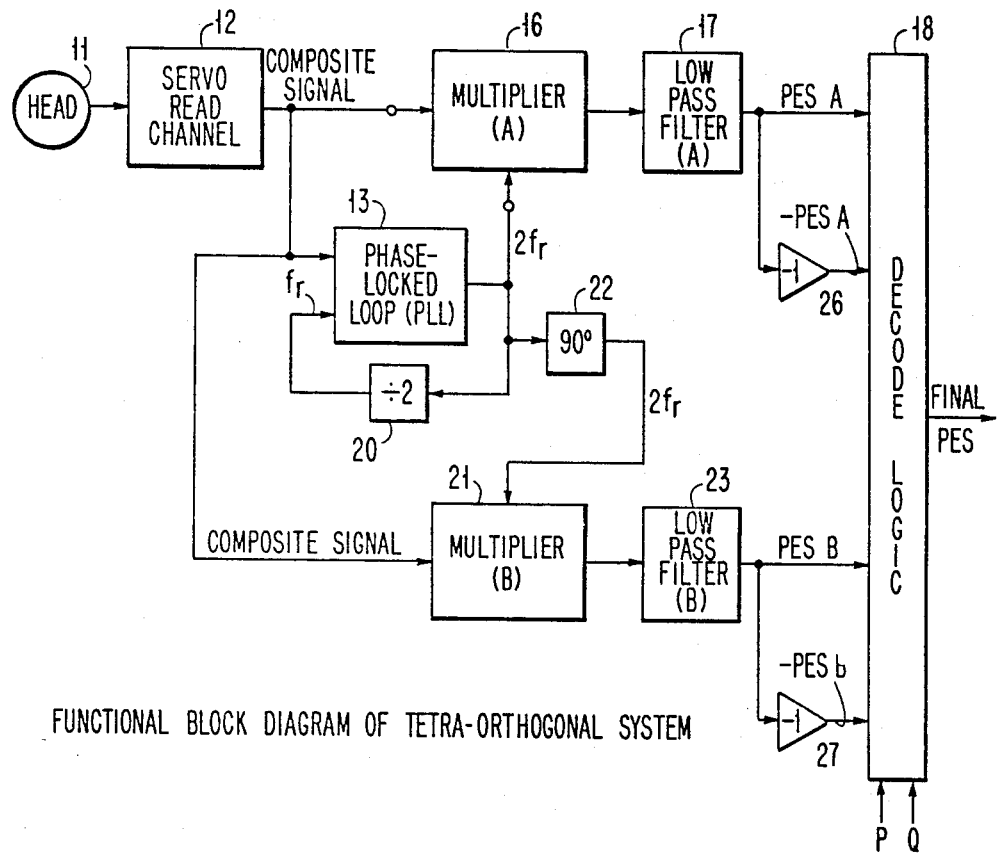
FIG. 4 is a block diagram of circuitry for implementing the present invention.

FIG. 4 shows a functional block diagram for utilizing the tetra-orthogonal encodement and detection scheme of the present invention. The signal from magnetic head 11 is amplified to a standard amplitude and filtered by the servo read channel 12. The composite signal contains the reference signal $f_r$ and the position signal encoded by amplitude and phase relative to the reference signal.

A phase locked loop (PLL) 13 locks onto the reference signal $f_r$ and provides a signal at the servo or position information frequency $2f_r$. A multiplier 16 for PES signal A extracts from the composite signal supplied thereto those components which are in phase with the $2f_r$ signal supplied thereto from PLL 13. These components are passed through a low pass filter 17 and become PES A which is supplied to a decode logic network 18. The output of PLL 13 is also supplied to a 90° phase shifter 22 and through a divide-by-two circuit 20 back to its own input.

Similarly, a multiplier 21 for PES signal B receives the $2f_r$ signal from PLL 13 through 90° phase shifter 22, and the composite input signal from the servo read channel 12. Multiplier 21 acts like multiplier 16 to extract from the composite input signal those components which are in phase with the $2f_r$ reference signal. These components are passed through a low pass filter 23 and become PES B which is supplied to decode logic network 18.

PES signal A and PES signal B are also supplied through inverters 26, 27, respectively to generate −PES A and −PES B inputs to decode logic network 18. Network 18 also receives two logic signals, P and Q inputs, on the labeled lines. The relationship between the PES A, PES B, P and Q signals is given in the table below the diagram of FIG. 4, as well as the decode logic which defines the final PES from network 18.

Figure 5:
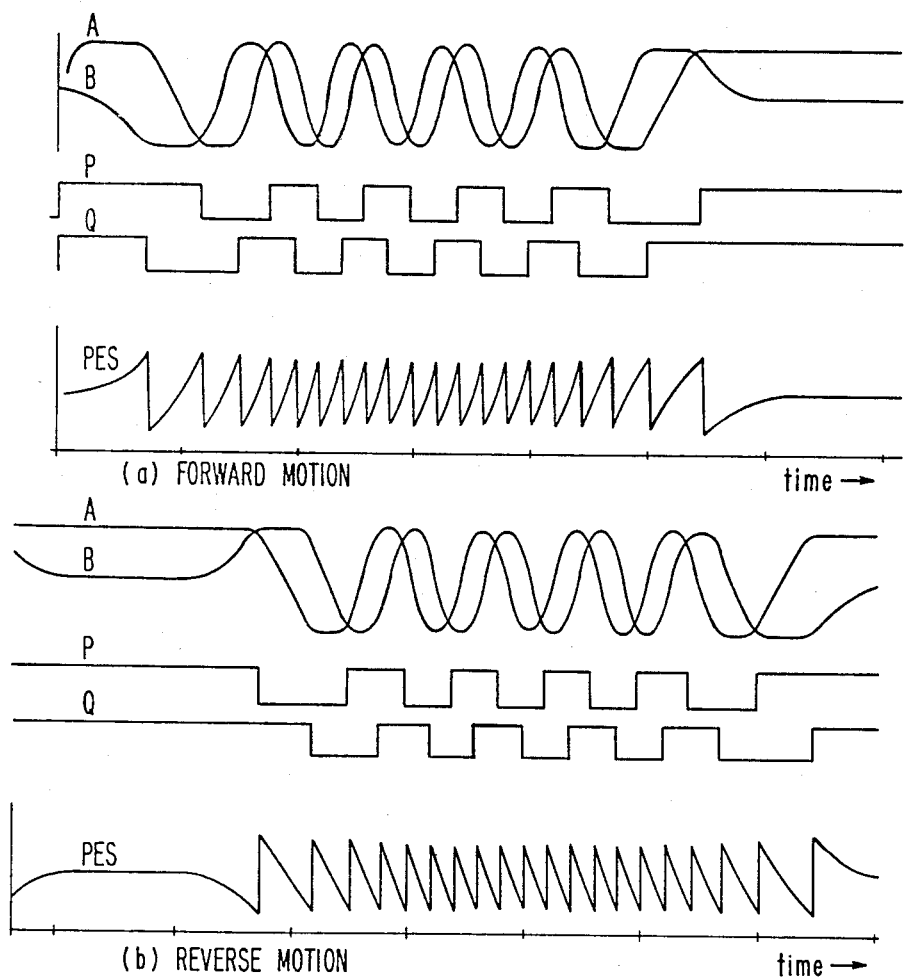
FIG. 5 contains waveforms of a computer simulation of the present invention for a twenty-track move or seek.

FIG. 5 shows various functions versus time in a simulated tetra-orthogonal system of single density. These were computed for a 20 track move, achieved by trapezoidal velocity profile (constant acceleration, coasting, and constant deceleration). The functions A and B are the equivalent of the raw PES in previous schemes. The logic functions P and Q, derived from A and B, were used to select portions of A and B for the final PES, according to the logic table shown in FIG. 4.

We claim:
1. A servo track encodement system for positioning a magnetic head over a selected one of a plurality of data tracks on a magnetic medium, comprising
 a servo pattern recorded on said medium along with said data tracks,
 said servo pattern comprising a plurality of servo tracks,
 each said servo track having a reference signal recorded therein, said reference signal having the same frequency and phase in each of said servo tracks,
 each said servo track also having a control signal recorded therein, said control signals having a higher frequency than said reference signals, the phases of said control signals in adjacent ones of said servo tracks cyclically revolving in 90° increments through 90°, 180°, 270°, and repeating themselves every four tracks, the boundary between adjacent servo tracks defining the centerline of one of said data tracks, and
 means for detecting the amount of each type of said control signal in the total signal reproduced by said head to produce an indication of the position of said head relative to one of said data track centerlines.

2. Apparatus in accordance with claim 1 in which said control signals have a frequency which is twice the frequency of said reference signal.

3. Apparatus in accordance with claim 1 in which said data tracks and said servo tracks have the same width.

4. Apparatus in accordance with claim 1 in which said data tracks are twice as wide as said servo tracks.

5. Apparatus in accordance with claim 1 in which said detecting means includes means for generating four separate position error signal (PES) components.

6. Apparatus in accordance with claim 5 including logic means for generating a primary signal and a quadrature signal, said primary and said quadrature signals determining which of said four PES components is the final PES signal.

7. Apparatus in accordance with claim 7 in which said four PES components are PES A, PES B, PES-A and PES-B.

* * * * *